US012776163B2

(12) United States Patent
Cohen

(10) Patent No.: US 12,776,163 B2
(45) Date of Patent: Oct. 27, 2026

(54) PEN WITH BIOMETRIC SIGNATURE VERIFICATION

(71) Applicant: Yaniv Cohen, Jerusalem (IL)

(72) Inventor: Yaniv Cohen, Jerusalem (IL)

( * ) Notice: Subject to any disclaimer, the term of this patent is extended or adjusted under 35 U.S.C. 154(b) by 220 days.

(21) Appl. No.: 18/690,735

(22) PCT Filed: Sep. 13, 2022

(86) PCT No.: PCT/IL2022/050990
§ 371 (c)(1),
(2) Date: Mar. 10, 2024

(87) PCT Pub. No.: WO2023/042197
PCT Pub. Date: Mar. 23, 2023

(65) Prior Publication Data

US 2024/0404323 A1 Dec. 5, 2024

(30) Foreign Application Priority Data

Sep. 14, 2021 (IL) .......................................... 286410

(51) Int. Cl.
*G06F 3/0354* (2013.01)
*G06F 21/32* (2013.01)
*G06V 40/30* (2022.01)

(52) U.S. Cl.
CPC .......... *G06V 40/37* (2022.01); *G06F 3/03545* (2013.01); *G06F 21/32* (2013.01)

(58) Field of Classification Search
CPC .... G06V 40/37; G06V 10/82; G06F 3/03545; G06F 21/32; H04L 9/3231; H04L 9/3247
(Continued)

(56) References Cited

U.S. PATENT DOCUMENTS

2005/0063570 A1* 3/2005 Kim ........................ G07C 9/247 382/119
2005/0180618 A1* 8/2005 Black .................... G06Q 20/341 382/124

(Continued)

FOREIGN PATENT DOCUMENTS

EP 1221127 B1 5/2009

OTHER PUBLICATIONS

International Search Report of PCT/IL2022/050990 Completed Nov. 16, 2022; Mailed Jan. 5, 2023 2 pages.

(Continued)

*Primary Examiner* — Ali Bayat
(74) *Attorney, Agent, or Firm* — The Roy Gross Law Firm, LLC; Roy D. Gross

(57) ABSTRACT

A system and methods are provided for authenticating handwriting of a user, including a pen that includes a motion sensor, a biometric sensor, a communications interface, a real-time clock and a processor with associated memory to perform: receiving a biometric signal of a user from the biometric unit; generating a user authentication indicator, wherein a match between the biometric signal and stored biometric information is a factor of the user authentication indicator; receiving a motion signal indicative of a user signature from the motion sensor and responsively determining a handwriting pattern instance; storing in the memory a signature record including the user authentication indicator, the handwriting pattern instance, and a time and date; and communicating the signature record by the communications interface to an external application.

10 Claims, 3 Drawing Sheets

(58) Field of Classification Search
USPC .......................................................... 382/119
See application file for complete search history.

(56) References Cited

U.S. PATENT DOCUMENTS

| | | | | |
|---|---|---|---|---|
| 2006/0138228 | A1 * | 6/2006 | Sanders | G06F 3/04883 235/435 |
| 2008/0115981 | A1 * | 5/2008 | Bechtel | G06F 3/03545 178/19.01 |
| 2009/0235082 | A1 * | 9/2009 | Garrett | H04L 9/3231 713/176 |
| 2010/0232730 | A1 * | 9/2010 | Silverbrook | H04N 1/00968 382/314 |
| 2011/0090182 | A1 | 4/2011 | Xu | |
| 2011/0320352 | A1 * | 12/2011 | Mehew | G06F 3/03542 340/5.82 |
| 2013/0106803 | A1 | 5/2013 | Tan | |
| 2014/0222968 | A1 | 8/2014 | Rakan | |
| 2016/0078277 | A1 * | 3/2016 | Sprigg | G06F 21/32 382/119 |
| 2017/0180988 | A1 * | 6/2017 | Kim | A61B 5/6887 |
| 2019/0121454 | A1 | 4/2019 | Kolarov | |

OTHER PUBLICATIONS

Written Opinion of PCT/IL2022/050990 Completed Nov. 16, 2022; Mailed Jan. 5, 2023 7 pages.

* cited by examiner

PEN WITH BIOMETRIC SIGNATURE VERIFICATION

CROSS REFERENCE TO RELATED APPLICATIONS

This application is a National Phase of PCT Patent Application No. PCT/IL2022/050990 having International filing date of Sep. 13, 2022, which claims the benefit of priority of IL Patent Application No. 286410, filed Sep. 14, 2021, the contents of which are all incorporated herein by reference in their entirety.

FIELD OF THE INVENTION

The invention generally relates to secure document signing.

BACKGROUND

Secure, digital signatures have become more common as a means for parties to indicate consent to agreements, such as transactions. However, some types of agreements, by law or convention, must still be signed with a physical signature. That is, some businesses, as well as some government authorities, still require parties to physically imprint their signature on a signed document. Many people, when required to provide an indication of their consent or presence, may also prefer that the indication be made by a physical signature in addition to, or instead of a digital signature.

Better methods for providing signatures would improve security and authentication and reduce false repudiation.

SUMMARY

The present invention provides a system and methods for verifying a user and a user signature, that is, for verifying that a signature is provided by a person whose identity was previously confirmed. Embodiments may include a pen that includes: a motion sensor; a biometric sensor; a communications interface; a real-time clock; and a processor and memory. The memory stores instructions that when executed by the processor cause the processor to perform steps of: receiving a biometric signal of a user from the biometric sensor; comparing the biometric signal with stored biometric information and responsively generating a user authentication indicator when there is a biometric match between the biometric signal and the stored biometric information; receiving a motion signal from the motion sensor, indicative of a user handwriting (that can be anything written, including a signature), and responsively validating a user handwriting pattern for written input and identifying in the written input a handwriting pattern for a user signature; storing in the memory a signature record, wherein the signature record includes the user authentication indicator, the user handwriting pattern, and a concurrent time and date generated by the real-time clock; and communicating the signature record by the communications interface to an external application.

The pen may also include an ink reservoir and an ink depositing nib. The pen may also include a camera, and the instructions may include receiving an image from the camera concurrently with the motion signal. The signature record may include the image, which may provide evidence of a time and/or place of a signing event.

The motion sensor may be an accelerometer. The biometric sensor may be a fingerprint sensor. The communications interface may b one of a wireless Bluetooth interface or a Universal Serial Bus (USB) interface.

The instructions may also include encrypting the signature record by a symmetric or asymmetric key before communicating the signature record.

The stored biometric information may be biometric information of multiple users. The match between the biometric signal and the stored biometric information may identify the user from among the multiple users.

The pen may also include a pressure sensing nib, and the instructions may also include steps of receiving a pressure signal from the pressure sensing nib and correlating the pressure signal with the motion signal to determine the user handwriting pattern.

A general handwriting match may be an additional factor of the user authentication indicator, wherein the user's handwriting is analyzed in other writing beyond the signature, including but not limited to, writing the date, his name and any other text the user may write with the pen of the invention. The instructions may also include comparing the user general handwriting pattern with one or more stored handwriting patterns to determine the handwriting match. After training, while in use, new and authenticated handwriting samples can be added to the stored handwriting patterns in order to improve the handwriting recognition module.

The instructions may also include generating each of the one or more stored handwriting patterns as a statistical signature model during a handwriting training stage. The statistical signature model is a neural network. The handwriting training includes training to recognize the general user handwriting pattern for any text (letters, numbers) not only the signature.

The instructions may also include steps of communicating the signature record when the user authentication indicator is generated and communicating an error message when no user authentication indicator is generated.

The instructions may also include steps of validating the user handwriting pattern of the signature record as an electronic signature.

Also provided by embodiments of the present invention is a system including the pen as describe above and the external application, wherein the external application is configured to display a form on a user interface viewed by the user. Instructions executed by the processor of the pen may be include receiving a request for the signature record from the external application and responsively communicating the signature record to the external application, wherein the external application is configured to responsively display the user handwriting pattern of the signature record on the form.

Also provided by embodiments of the present invention is a method for authenticating handwriting of a user, the method comprising: providing a pen including a motion sensor, a biometric sensor, a communications interface, a real-time clock and a processor with associated memory storing instructions that when executed by the processor cause the processor to perform: receiving a biometric signal of a user from the biometric sensor; comparing the biometric signal with stored biometric information and responsively generating a user authentication indicator when there is a biometric match between the biometric signal and the stored biometric information; receiving a motion signal, indicative of a user handwriting, from the motion sensor and responsively validating a user handwriting pattern for written input and identifying in the written input a handwriting pattern for a user signature; storing in the memory a signature record, wherein the signature record includes the user authentication indicator, the user handwriting pattern, and a concurrent time and a date generated by the real-time clock; and communicating the signature record by the communications interface to an external application.

BRIEF DESCRIPTION OF DRAWINGS

For a better understanding of various embodiments of the invention and to show how the same may be carried into effect, reference will now be made, by way of example, to the accompanying drawings. Structural detail of the invention are shown to provide a fundamental understanding of the invention, the description, taken with the drawings, making apparent to those skilled in the art how the several forms of the invention may be embodied in practice.

In the accompanying drawings.

DETAILED DESCRIPTION

Figure 1:
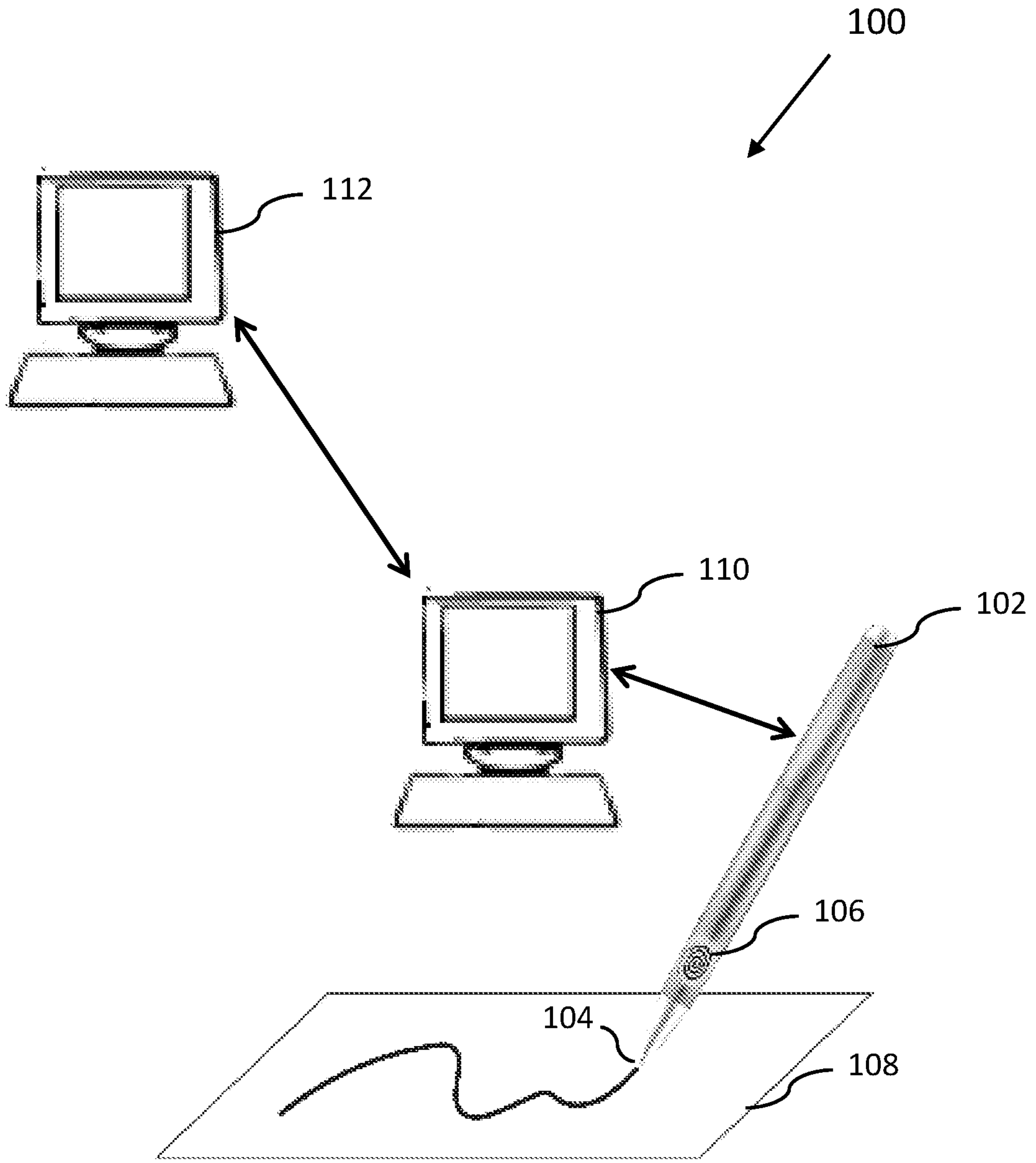
FIG. 1 is a schematic illustration of a system for authenticating a user signature, according to some embodiments of the present invention.

Embodiments of the present invention provide a system and methods for authenticating handwriting of a user. It is to be understood that the invention and its application are not limited to the system and methods described below or to the arrangement of the components set forth or illustrated in the drawings, but are applicable to other embodiments that may be practiced or carried out in various ways.

FIG. 1 is a schematic illustration of a system 20 for authenticating a user signature, according to some embodiments of the present invention. The system includes a computerized pen 102, which typically includes a pen nib 104 for writing, such as a ball point or felt tip point, and a biometric sensor 106, such as a fingerprint sensor, as well as additional elements described hereinbelow, such as additional sensors. Typically pen 102 includes ink and can be used to write like a standard pen on a surface such as a page 108. The page 108 may, for example, be a document that a user signs with a signature to indicate receipt or consent.

The pen 102 is also configured to communicate with external applications running on local or remote computers, such as a local computer 110 and/or a remote computer 112. The communications may be by wireless or wired means, e.g., by wireless Bluetooth or Wi-Fi protocols, or by wired ethernet or USB protocols. When configured to operate by USB protocol, or by other communications means that provide power, the pen may be provided without an internal power source. Otherwise, the pen may have an internal power source such as a rechargeable or non-rechargeable battery. The pen may also have a switch to turn on power, or by other power-on means known in the art.

In some scenarios in which the pen is used, an application on the local computer 110 may present a document on the computer's screen that is to be electronically signed by a user of the computer. The user may then sign his signature with the pen 102 while viewing the document. While the user is signing, or subsequently, the pen may transmit a handwriting pattern that is a representation of the signature to the local computer 110. The pen may also transmit a biometric signal with the handwriting pattern, which may be used to authenticate the user.

In further scenarios, the application on the local computer may receive the document described above from an application running on the remote computer 112. Hereinbelow, the application on the local computer and/or the application on the remote computer are collectively referred to as an "external application." The external application may digitally associate the handwriting pattern as well as the biometric signal with the document presented to the user. For example, the handwriting pattern as well as the biometric signal may be stored in comment fields of a file having a document format, or together with the file in a database or repository of documents. Alternatively, the external application may generate an electronic signature attached to the document, according to an accepted legal procedure for creating an industry-recognized electronic signature.

Figure 2:
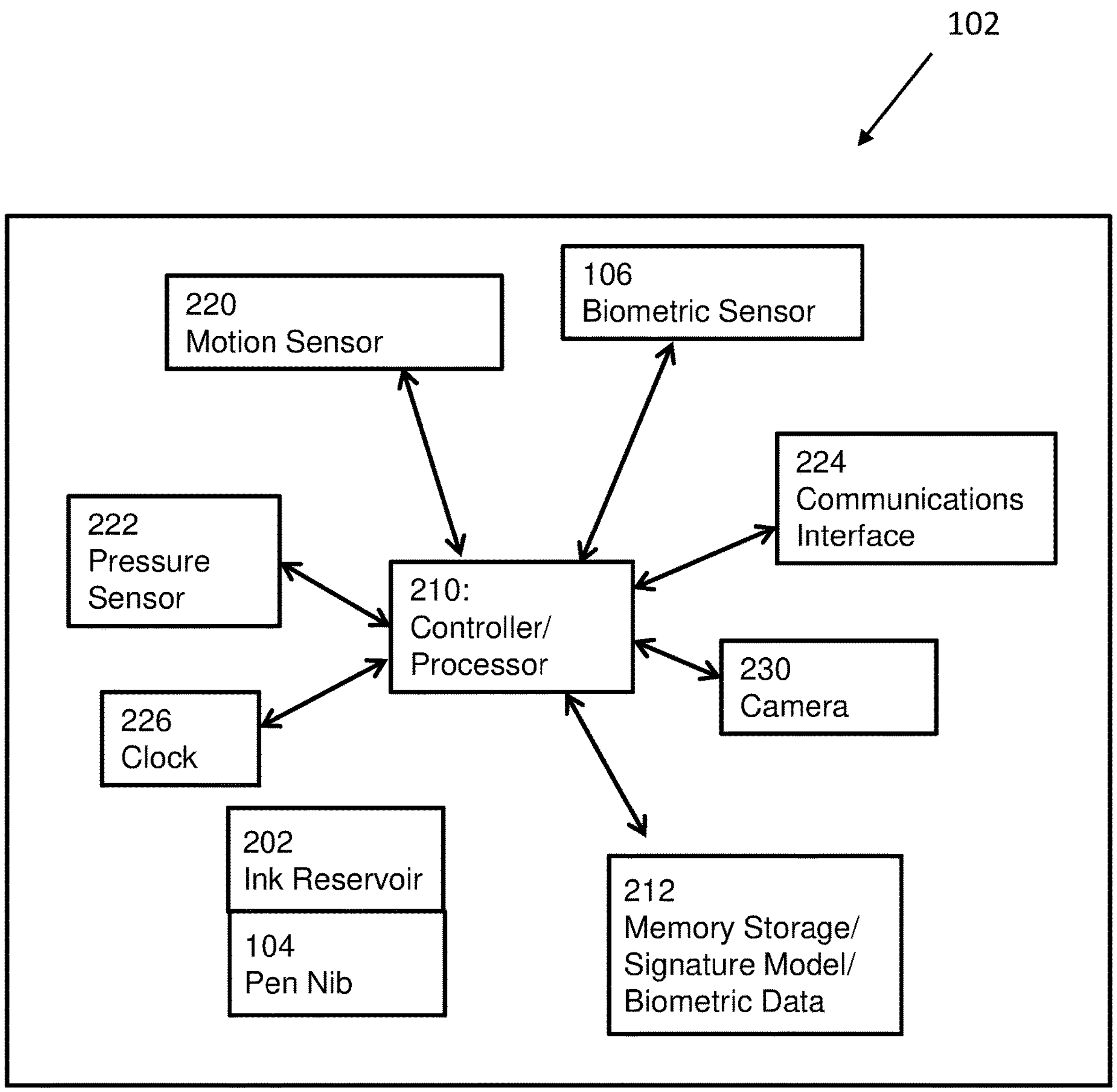
FIG. 2 is a block diagram of a computerized pen for authenticating a user signature, according to some embodiments of the present invention

FIG. 2 is a block diagram of the pen 102 for authenticating a user signature, according to some embodiments of the present invention. Pen 102 may include the pen nib 106, such as a ball point or felt tip pen, for making a physical signature. An ink reservoir 202 would also be included in the pen when the pen is intended for providing a physical signature. Alternatively, the pen may lack an ink nib, as the local computer may be configured to present the user's signature on its screen in real time, as the user is signing the signature.

The pen 102 includes a processor 210 (typically a real time controller) designed to receive and to issue signals according to instructions stored in memory storage 212. Some of the processing steps described hereinbelow may also be performed by the external application executing on the local computer.

In addition to the biometric sensor 106, described above, the pen 102 may also include a motion sensor 220, a communications interface 224, and a real-time clock 226. A pressure sensor 222 may also be configured with the pen nib, to determine pressure on the nib while a user is writing (i.e., signing) with the pen.

A handwriting pattern representing a user's signature may be generated by the processor 210 from signals received either from the biometric sensor or the pressure sensor, or from a combination of both. The biometric signal and the pressure signal may be synchronized by the processor. That is, for each of a series of time increments, during a period of time that a user is signing, positions of the pen are recorded by the processor together with a pressure measurement corresponding to each position. For example, a user signature may be recorded for a period of one second, with measurements of the biometric signal and of the pressure signal taken at 2 ms. increments. Start and stop times of the period defining the motion and/or pressure of a signature may be defined by signals from the motion sensor and/or the pressure sensor. For example, a motion signal defining the signal may be triggered by movement of the pen when in an upright position, and/or by pressure on the pen nib.

The time indicated by the real-time clock 226 may also be recorded by the processor, together with the handwriting pattern.

The processor may compare the biometric signal with biometric data of the user that is previously stored in the memory 212. If there is a match, the processor may generate a biometric validation (i.e., authentication) indication, which may be transmitted together with the handwriting pattern to the external application. Similarly, the handwriting pattern itself may be compared with a previously generated signature model of the user, also stored in memory 212. If there is a match, the processor may generate a handwriting pattern validation (i.e., authentication) indication, which may be transmitted together with the handwriting pattern to the external application. In some embodiments, the handwriting pattern and biometric authentication indications may be combined as a single authentication indication, for example by requiring that both measures of authentication be confirmed in order to generate the authentication indication.

In some embodiments, the handwriting and signature models are a machine learning model, such as a neural network, that is trained on one or multiple signatures of the user and one or more handwritings (non-signature) of the user. In further embodiments, the memory storage may be configured with multiple signature models of multiple respective users, as well as multiple sets of biometric data for the multiple respective users, such that the pen may be configured to authenticate any one of the multiple users.

In further embodiments, the pen 102 also includes a camera 230, which may record an image or video at the time of signing of one or more of the following: the signature signed, additional written input (name, date, any other writing), the document being signed, the user's face, the environment in which the signing is performed (e.g., the room), and the witnesses to the signing.

Figure 3:
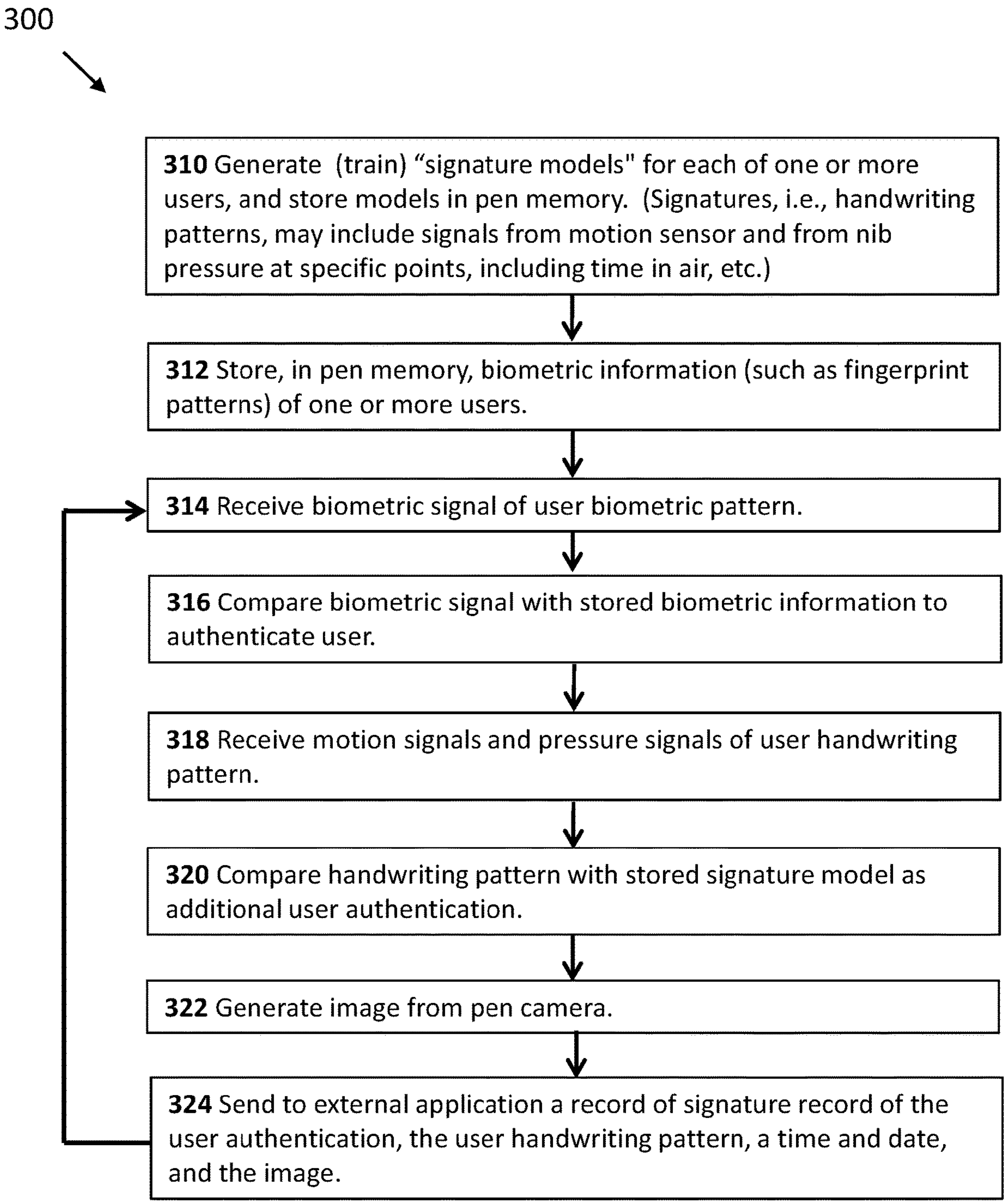
FIG. 3 is a flow chart of a process for authenticating a user signature, according to some embodiments of the present invention.

FIG. 3 is a flow chart of a process for authenticating a user signature, according to some embodiments of the present invention. Two set-up steps are typically applied to prepare the pen 102 for use. At a setup step 310, signature "models" of the one or more users of the pen may be generated and stored in the pen memory. Typically, instructions for executing these steps are performed by the pen processor. Alternatively, models may be prepared by an external computer and stored in the pen memory, together with instructions for comparing new signals acquired during operation to the stored models.

A signature model may be a statistical model of a user's typical handwriting patterns, such as a machine learning model, which may be, for example, a neural network-based model generated from multiple handwriting samples. Data for training the model may include signals from the motion sensor and from the nib pressure sensor, which typically includes multiple points, including pen time in air and points at which pen changes direction.

At an additional setup step 312, biometric information (such as fingerprint patterns) of one or more users are stored in the pen memory to subsequently authenticate users of the pen.

After setup, at a step 314, a biometric signal of a user, transmitted from the biometric sensor, is received by the processor, representing a biometric pattern of a user. At a step 316, the signal is compared with stored biometric information to authenticate the user, or to determine that the user is not the authorized user (i.e., an invalid user).

At a step 318, the processor receives motion signals and/or pressure signals of a user signing a document and responsively stores a handwriting pattern.

At a step 320, the processor may determine from stored handwriting models whether or not the received handwriting pattern is valid. This may be an alternative to biometric validation, or an additional means of validating the user.

If the pen includes a camera, at a step 322 an image or video of the user's act of signing may also be acquired, as described above.

At a step 324, the processor stores signature record that may include one or more elements, such as a user authentication indicator, the user handwriting pattern, a time and date (received from the internal real-time clock), and the image. The processor may then transfer the signature record to an external application. The processor may also transmit the handwriting pattern in real time to an external application, as described above, in order that the handwriting pattern may appear on a screen of an external local computer (such as a personal computer, tablet, or mobile phone).

In a typical scenario of pen usage, a secure communications method to authenticate the transmission is configured between the pen and the external application. Alternatively, a user may view a document, either physical and on-line, and sign it, while the pen records the signature and time, while also authenticating the user. The signature record of an authentication indicator, including the handwriting pattern, and the time, may then be transferred to an external application either concurrently with the documenting signing or at a later time.

An electronic signature, or e-signature, or digital signature, refers to data in electronic form, which is logically associated with reference data (such as a form or any other document) also in electronic form, and which is applied by a person to the reference data to indicate the person is legally "signing" the reference data. This type of signature may have the same legal standing as a handwritten signature as long as it adheres to the requirements of specific regulations under which it was created (e.g., eIDAS in the European Union, NIST-DSS in the USA or ZertES in Switzerland).

In some embodiments, the pen is used to provide an electronic signature, for example, to sign a legal document in commerce or ecommerce transactions. Thus the pen is able to transmit a signature record that is also valid as an electronic signature. A user may select an option to add a digital signature to a selected document, for example, by pressing a button on the pen or by selecting this feature in the mobile application. The user then proceeds to sign his signature on paper, and once authenticated, the mobile application produces a digital signature certificate associated with the selected document.

In some embodiments, the pen is disabled, so that its ink cannot flow and thus the pen cannot be used for writing, until the user authentication is successful.

In some embodiments, graphology and/or forensic graphology methods are applied to authenticate the user's handwriting. Visual-graphological diagnosis for user authentication is done in a deductive manner, comparing the handwriting to be authenticated with the user's stored handwriting and searching for identical or similar patterns. Each time a user's handwriting is authenticated, more knowledge can be gained about the user's handwriting, so future handwriting samples can be authenticated more precisely.

Graphology literature discloses that a person may have 500 to 1,000 particular and individual writing patterns, which the computerized pen 102 aims to identify in order to authenticate the handwriting.

In some embodiments, the computerized pen 102 comprises one or more of the following features/tools assisting in the handwriting identification:

(1) Holding pressure sensors on the computerized pen 102 to analyze the pressure of the user's hand on the pen 102 while holding the pen 102 and while writing;

(2) Pressure sensors 222 on the computerized pen 102 to analyze the pressure of the pen 102 on the writing platform while the user is writing;

(3) Gyroscope to indicate the angle the pen 102 is held while writing and while being held;

(4) Motion sensor 220 to record the speed the pen 102 is moved;

(5) Camera 230 to record the handwriting (using stills and/or video); and (6) A processor 210 to analyze received data, including letter spacing and ink distribution in order to determine writing patterns.

It is to be understood that embodiments that do not depart from the teachings of the present invention will be evident to those skilled in the art. Such embodiments, including obvious changes and modifications come within the purview of the present invention and the appended claims. It will be readily apparent that processing aspects of the various methods and algorithms described herein may be implemented by, for example, appropriately programmed general purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A processor as described herein may be any one or more microprocessors, central processing units (CPUs), computing devices, microcontrollers, digital signal processors, or like devices. Computer memory may be, but is not limited to, non-volatile media. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

Sequences of instructions may be delivered from memory to a processor, may be carried over a wireless transmission medium, and/or may be formatted according to numerous formats, standards or protocols, such as Bluetooth, TDMA, CDMA, 3G.

Any illustrations or descriptions of arrangements for stored representations of information may be implemented by any number of arrangements, e.g., tables, files, or databases. Similarly, any illustrated entries of the stored data represent exemplary information only; one of ordinary skill in the art will understand that the number and content of the entries can be different from those described herein. Further, despite any depiction of stored data as databases or tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses such data.

The present invention can be configured to work in a network environment including a computer that is in communication, via a communications network, with one or more devices. The computer may communicate with the devices directly or indirectly, via a wired or wireless medium such as the Internet, LAN, WAN, Wi-Fi or via any appropriate communications means or combination of communications means.

The invention claimed is:

1. A pen comprising a processor and memory, for electronically signing a digital document by authenticating handwriting of a user, the pen further comprising:

a motion sensor;

a biometric sensor;

a communications interface; and a real-time clock;

wherein the memory stores instructions that when executed by the processor cause the processor to perform steps of:

receiving a biometric signal of a user from the biometric sensor;

comparing the biometric signal with stored biometric information and responsively generating a user authentication indicator when there is a biometric match between the biometric signal and the stored biometric information;

receiving a motion signal, indicative of a user handwriting, from the motion sensor and responsively validating a user handwriting pattern for written input and identifying in the written input a handwriting pattern for a user signature, wherein validating said user handwriting comprises comparing the user handwriting pattern with one or more stored handwriting patterns to determine the handwriting match, and further comprising generating each of the one or more stored handwriting patterns as a statistical signature model during a handwriting training stage;

storing in the memory a signature record, wherein the signature record includes the user authentication indicator, the user handwriting pattern, and a concurrent time and date generated by the real-time clock; and communicating the signature record by the communications interface to an external application that attaches an electronic signature to said digital document, said electronic signature being legally binding in accordance with the specific regulations that the electronic signature was created upon.

2. The pen of claim 1, further comprising a camera, and wherein the instructions further comprise receiving an image from the camera concurrently with the motion signal and wherein the signature record includes the image.

3. The pen of claim 1, wherein the motion sensor is an accelerometer.

4. The pen of claim 1, wherein the biometric sensor is a fingerprint sensor.

5. The pen of claim 1, wherein the communications interface is one of a wireless Bluetooth interface or a Universal Serial Bus (USB) interface.

6. The pen of claim 1, further comprising encrypting the signature record by a symmetric or asymmetric key before communicating the signature record.

7. The pen of claim 1, wherein the stored biometric information is biometric information of multiple users and wherein the match between the biometric signal and the stored biometric information identifies the user from among the multiple users.

8. The pen of claim 1, further comprising a pressure sensing nib, and further comprising steps of receiving a pressure signal from the pressure sensing nib and correlating the pressure signal with the motion signal to determine the user handwriting pattern.

9. The pen of claim 1, wherein the statistical signature model is a neural network.

10. A method for electronically signing a digital document by authenticating handwriting of a user, the method comprising:

providing a pen including a motion sensor, a biometric sensor, a communications interface, a real-time clock, and a processor with associated memory storing instructions that when executed by the processor cause the processor to perform:

receiving a biometric signal of a user from the biometric sensor;

comparing the biometric signal with stored biometric information and responsively generating a user authentication indicator when there is a biometric match between the biometric signal and the stored biometric information;

receiving a motion signal, indicative of a user handwriting, from the motion sensor and responsively validating a user handwriting pattern for written input and identifying in the written input a handwriting pattern for a user signature, wherein validating said user handwriting comprises comparing the user handwriting pattern with one or more stored handwriting patterns to determine the handwriting match, and further comprising generating each of the one or more stored handwriting patterns as a statistical signature model during a handwriting training stage;

storing in the memory a signature record, wherein the signature record includes the user authentication indicator, the user handwriting pattern, and a concurrent time and date generated by the real-time clock; and communicating the signature record by the communications interface to an external application, said external application configured to attach an electronic signature to said digital document, said electronic signature being legally binding in accordance with the specific regulations that the electronic signature was created upon.

* * * * *